United States Patent [19]

Hirabayashi et al.

[11] Patent Number: 5,175,400
[45] Date of Patent: Dec. 29, 1992

[54] APPARATUS FOR CONTROLLING ELEVATOR DOOR BASED ON POWER SOURCE VOLTAGE

[75] Inventors: Terumi Hirabayashi; Masamoto Mizuno; Masanori Tawada; Toshiyuki Kodera, all of Inazawa, Japan

[73] Assignee: Mitsubishi Denki Kabushiki Kaisha, Japan

[21] Appl. No.: 662,014

[22] Filed: Feb. 28, 1991

[30] Foreign Application Priority Data

Mar. 1, 1990 [JP] Japan .................. 2-47214

[51] Int. Cl.$^5$ .............................. B66B 13/14
[52] U.S. Cl. .................. 187/103; 187/109; 187/114; 187/130
[58] Field of Search .......... 187/103, 119, 109; 318/721, 801, 331, 212, 762

[56] References Cited

U.S. PATENT DOCUMENTS

| | | | |
|---|---|---|---|
| 3,814,214 | 6/1974 | Booker, Jr. ................... | 187/103 |
| 4,051,419 | 9/1977 | Takahashi ..................... | 318/721 |
| 4,227,137 | 10/1980 | Hartman ........................ | 318/801 |
| 4,300,663 | 11/1981 | Hmelovsky et al. ........... | 187/103 |
| 4,776,433 | 10/1988 | Lagree et al. ................. | 187/103 |
| 4,815,567 | 3/1989 | Ikesima ......................... | 187/119 |
| 4,982,816 | 1/1991 | Doi et al. ...................... | 187/119 |
| 5,070,290 | 12/1991 | Iwasa et al. .................... | 187/109 |

Primary Examiner—A. D. Pellinen
Assistant Examiner—L. Colbert
Attorney, Agent, or Firm—Leydig, Voit & Mayer

[57] ABSTRACT

An apparatus for controlling an elevator door based on controlling an electric motor for driving the door with a microcomputer and resetting the microcomputer when the power supply fails has a voltage monitor which detects the power source voltage and a braking circuit forcibly brakes the motor if the power source voltage detected by the voltage monitor is lower than a prescribed voltage. The motor is forcibly braked when the detected power source voltage is between the prescribed voltage and the lower limit of the range of voltages at which the microcomputer can operate.

9 Claims, 6 Drawing Sheets

APPARATUS FOR CONTROLLING ELEVATOR DOOR BASED ON POWER SOURCE VOLTAGE

BACKGROUND OF THE INVENTION

1. Field of the Invention

This invention relates to an apparatus for controlling an electric motor for opening and closing an elevator door by a microcomputer.

2. Description of the Related Art

FIG. 5 shows a conventional elevator door controller disclosed in Japanese Patent Laid-Open No. 1-92191. As shown in FIG. 5, a power circuit 2 is connected to a power source 1, and an electric motor 3 for driving a door is connected to the power circuit 2. An encoder 4 produces pulses proportional in number to the angle of rotation of the electric motor 3. A one-chip microcomputer 7 has a CPU 7A, a ROM 7B, a RAM 7C, a pulse count unit 7D for counting input pulses, an input/output port 7E, an A/D converter 7F, and a pulse width modulation (PWM) unit 7G for generating a pulse width modulated (PWM) signal. The encoder 4 is connected to the pulse count unit 7D. To the input/output port 7E are connected an elevator control panel 5 which outputs a door opening command signal 5a or a door closing command signal 5b, and a position switch 6 which outputs a fully opened position signal 6a or a fully closed position signal 6b which indicates that the door is in a fully opened position or a fully closed position.

A control power source 8 for supplying the control circuit with electric power from the power source 1 is connected to the power source 1. A 5 V monitor circuit 9 is connected to the control circuit 8. The 5 V monitor circuit 9 detects a rise or a fall of 5 V power for the microcomputer 7 and supplies a reset pulse to a reset terminal of the microcomputer 7. A gate signal generator circuit 10 is connected to the PWM unit 7G and the 5 V monitor 9 of the microcomputer 7.

As shown in FIG. 6, the power source 1 has a converter 1B which is connected to a secondary coil 1A of a transformer and which is formed of diodes 1a to 1d constituting a rectifier circuit and a smoothing capacitor 1e.

An AC voltage output from the secondary coil 1A of the transformer is rectified and smoothed by the converter 1B, and the rectified output is again converted into an AC voltage by the power circuit 2 to be output to the electric motor 3.

The encoder 4 generates pulses proportional in number to the angle of rotation of the electric motor 3 and supplies the pulses to the pulse count unit 7D.

The operation of the one-chip microcomputer 7 will now be described below with reference to FIG. 7. The program illustrated by this flow chart is stored in the ROM 7B.

First, in step 21, door opening command signal 5a or door closing command signal 5b from the control panel 5 is read. In step 22, a determination is made as to whether the door is to be opened or closed. If the door is to be opened, the process proceeds to step 23 and the value of data in the pulse count unit 7D is read. Next, in step 24, fully opened position signal 6a or fully closed position signal 6b is received from the position switch 6, and the position of the door is calculated from the pulse count unit 7D data value. In step 25, the speed Vt of the electric motor 3 is calculated from the above data value. In step 26, the speed command mode for acceleration, constant speed, or deceleration is discriminated according to the position of the door. Thereafter, in step 27, a speed command value Vp corresponding to the door position is read from the ROM 7B, and/in step 28, the deviation of the speed Vt from the speed command value Vp is calculated. Calculation for phase compensation is performed in step 29 and the above deviation is multiplied by a gain K in step 30. In step 31, the torque is limited according to the door position. The value thus calculated is supplied to the PWM unit 7G and PWM signal is output from the PWM unit 7G in step 32.

If it is determined in step 22 that the door is to be closed, the processing for closing the door is conducted basically in conformity with the above-described door opening processing.

The PWM signal is output to the gate signal generator circuit 10 and the gates of power transistors of the power circuit 2 are PWM-controlled, thereby enabling the speed of the electric motor, i.e., the speed of the door to be controlled with accuracy.

If the voltage of the control power source 8 drops due to a shutoff of the power source 1 or a momentary service interruption, the 5 V monitor circuit 9 generates a reset pulse, the one-chip microcomputer 7 is thereby stopped and the power circuit 2 is shut off.

In the above-described conventional elevator door controller, the one-chip microcomputer 7 is reset if the voltage of the control power source drops. If resetting takes place when the door is being opened or closed at the highest speed, the power circuit 2 is shut off and cannot apply any braking force to the electric motor, so the door moves by inertial force and continues opening or closing at a high speed, creating a dangerous situation.

SUMMARY OF THE INVENTION

In view of these problems, an object of the present invention is to provide an apparatus for controlling a elevator door capable of preventing runaway of the door even if the power source voltage is reduced.

An apparatus for controlling an elevator door according to the present invention comprises a voltage monitor means for detecting a power source voltage and a brake means for forcibly braking the motor if the power source voltage detected by the voltage monitor means is lower than a minimum voltage determined by the power source voltage variation.

DESCRIPTION OF THE PREFERRED EMBODIMENT

An embodiment of the present invention will now be described below with reference to the accompanying drawings.

Figure 1:
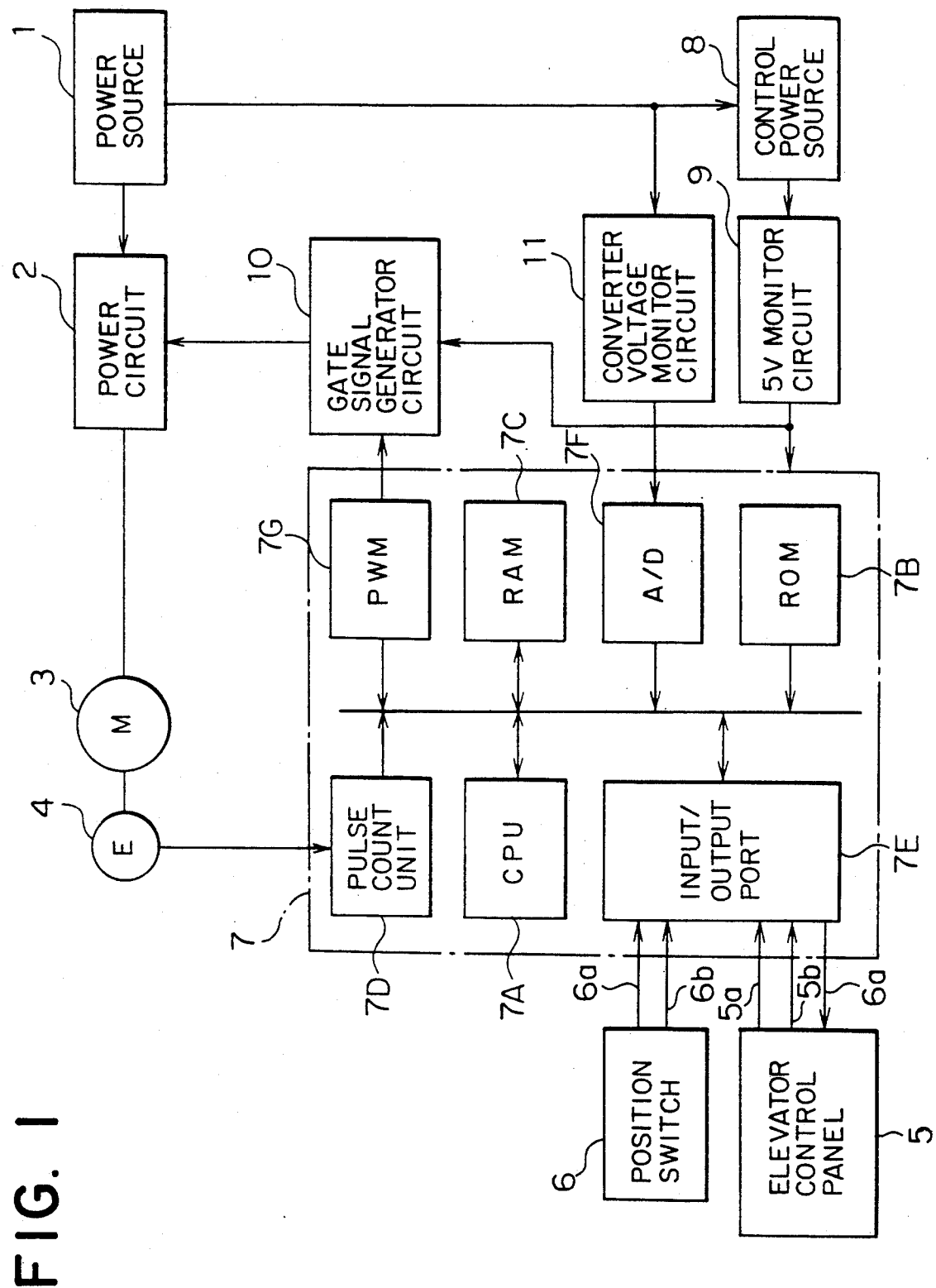
FIG. 1 is a block diagram of an embodiment of an elevator door controller according to the present invention.

Referring to FIG. 1, a power circuit 2 is connected to a power source 1, and an electric motor 3 for driving an elevator door is connected to the power circuit 2. An encoder 4 produces pulses proportional in number to the angle of rotation of the electric motor 3. A one-chip microcomputer 7 is provided which has a CPU 7A, a ROM 7B, a RAM 7C, a pulse count unit 7D for counting input pulses, an input/output port 7E, an A/D converter 7F, and a pulse width modulation (PWM) unit 7G for generating a pulse width modulated (PWM) signal. The encoder 4 is connected to the pulse count unit 7D. To the input/output port 7E are connected an elevator control panel 5 which outputs a door opening command signal 5a or a door closing command signal 5b, and a position switch 6 which outputs a fully opened position signal 6a or a fully closed position signal 6b which indicates that the door is in a fully opened position or a fully closed position.

A control power source 8 for supplying the control circuit with electric power from the power source 1 is connected to the power source 1. A 5 V monitor circuit 9 is connected to the control power source 8. The 5 V monitor circuit 9 detects a rise or a fall of 5 V power for the microcomputer 7 and supplies a reset pulse to a reset terminal of the microcomputer 7. A gate signal generator circuit 10 is connected to the PWM unit 7G and the 5 V monitor 9 of the microcomputer 7.

Figure 6:
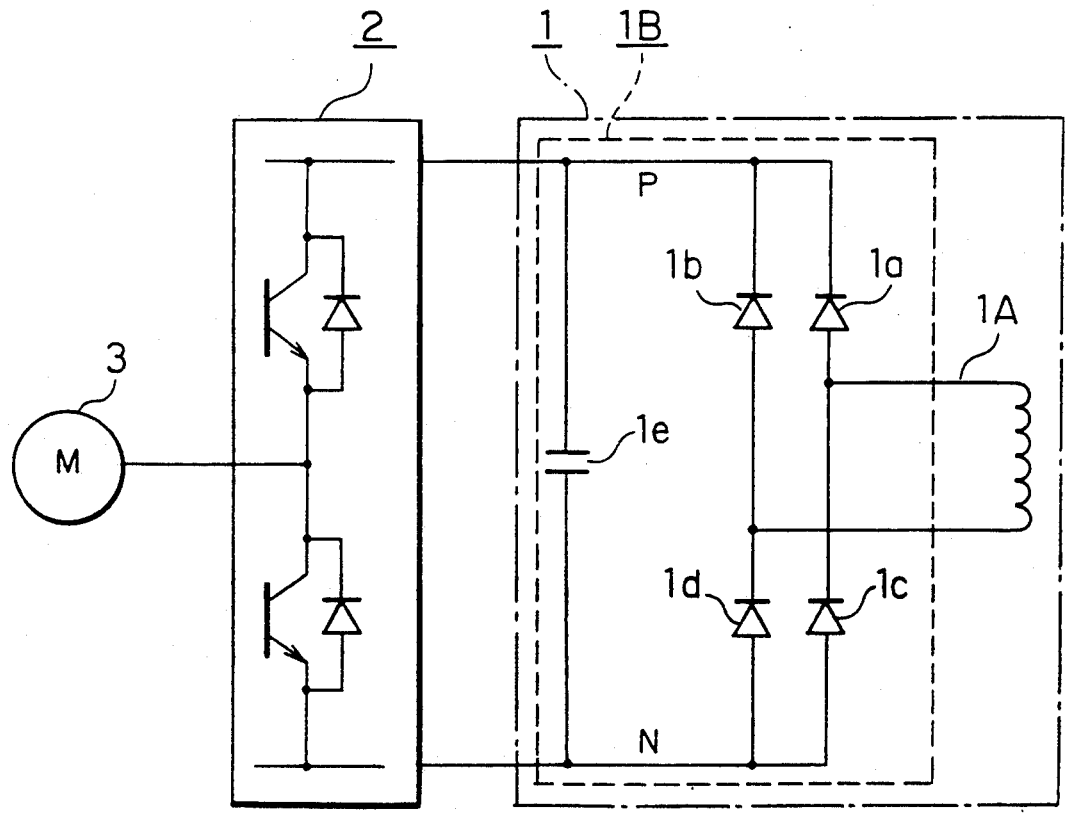
FIG. 6 is a circuit diagram of a power source portion of the controller shown in FIG. 5.
Figure 5:
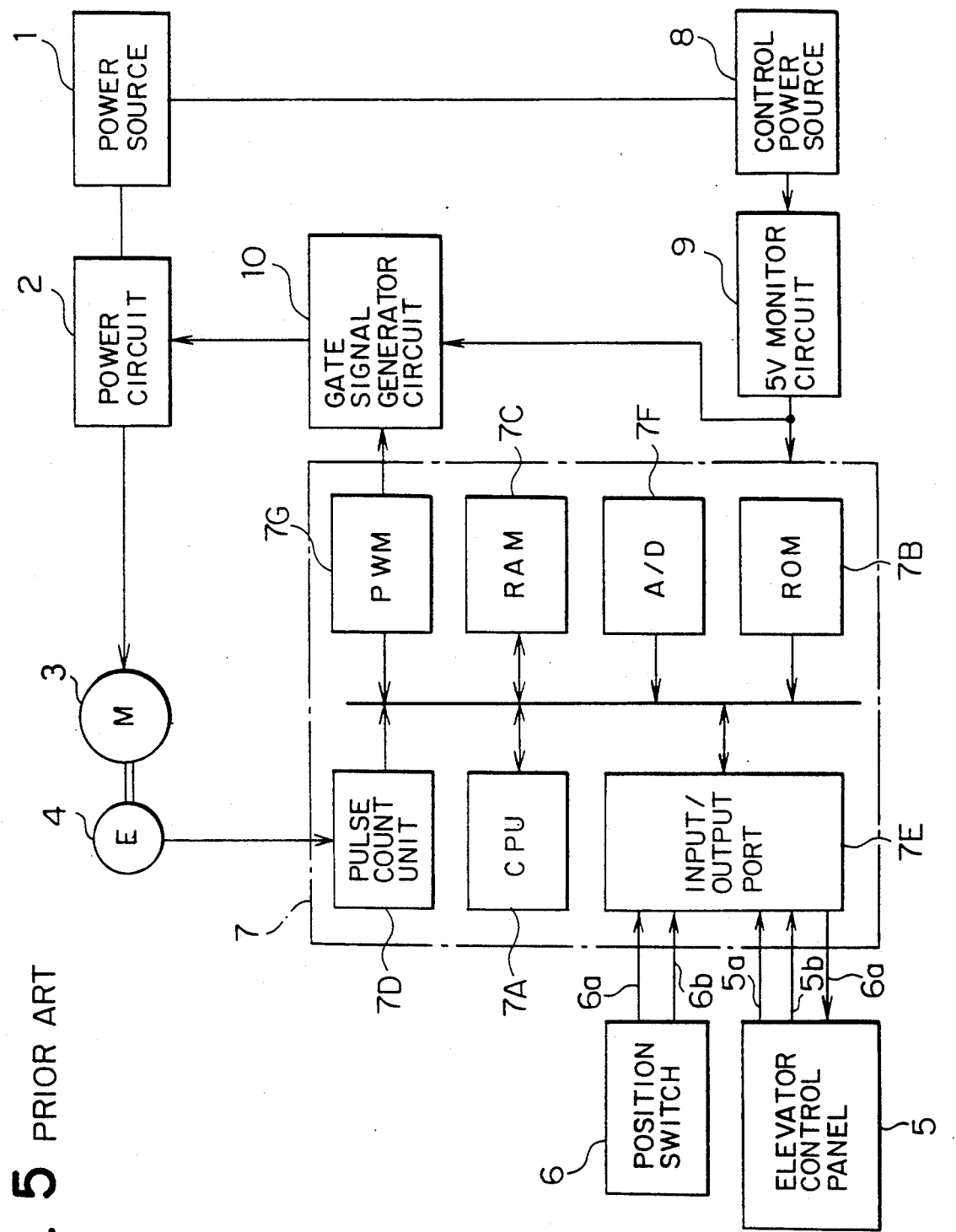
FIG. 5 is a block diagram of a conventional elevator door controller.

The construction of the power source 1 is the same as shown in FIG. 6, and the power source 1 has a converter 1B connected to a secondary coil of a transformer 1A.

A converter voltage monitor circuit 11 is connected between the power source 1 and the A/D converter 7F of the microcomputer 7. The converter voltage monitor circuit 11 serves to detect the voltage output from the converter 1B of the power source 1 shown in FIG. 6, i.e., the DC voltage between lines P and N of FIG. 6, and is constituted by an insulated amplifier (not shown) and an operational amplifier which amplifies the output from the insulated amplifier. The gain of the operational amplifier is selected so that the level of the output from the converter voltage monitor circuit 11 is sightly lower than the maximum input voltage of the A/D converter 7F when the converter voltage is at a maximum, thereby improving the accuracy of the operation of the A/D converter 7F.

Figure 2:
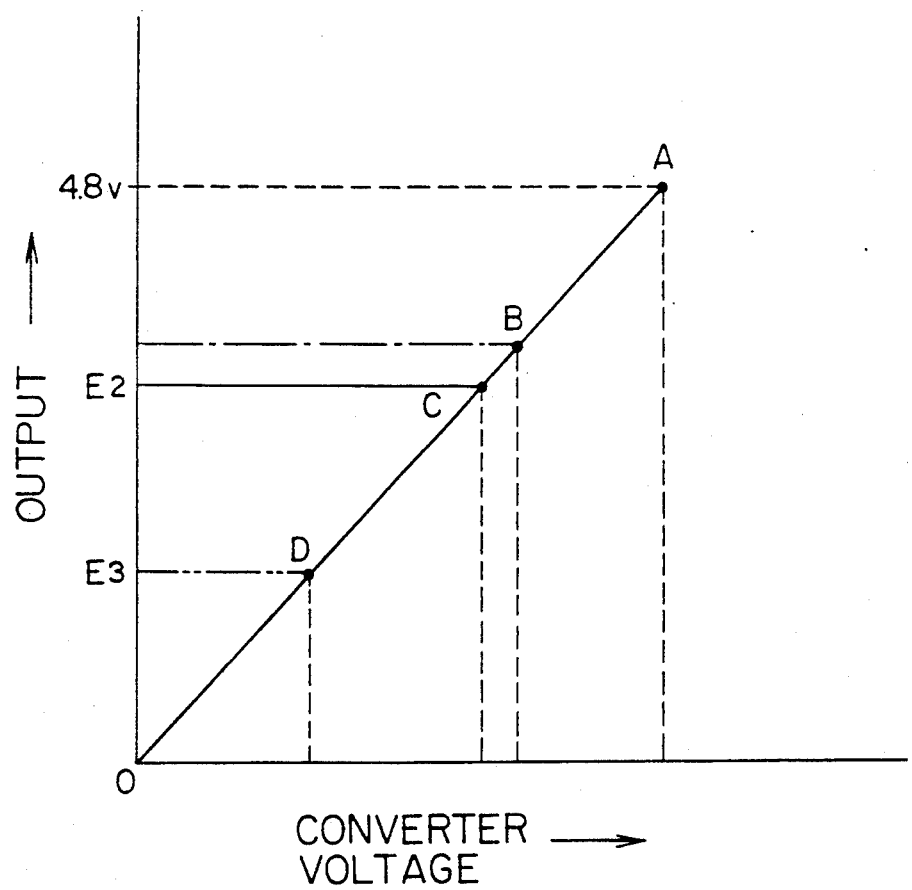
FIG. 2 is a diagram of the input/output characteristics of a converter voltage monitor circuit used in the embodiment shown in FIG. 1.

FIG. 2 shows an input/output characteristic of the converter voltage monitor circuit 11. Points A and B in FIG. 2 indicate the maximum and the minimum of the converter voltage during ordinary operation. The output corresponding to point A is set to, for example, 4.8 V. Point D indicates the lower limit of the range of converter voltages at which the microcomputer 7 can normally operate by being supplied with power from the power source 1 through the control power source 8. That is, if the converter voltage is reduced so that the level of the output from the converter voltage monitor circuit 11 is lower than the value $E_3$ designated by point D, the 5 V monitor circuit 9 sends a reset pulse to the reset terminal of the microcomputer 7, whereby the microcomputer 7 is reset.

Figure 3:
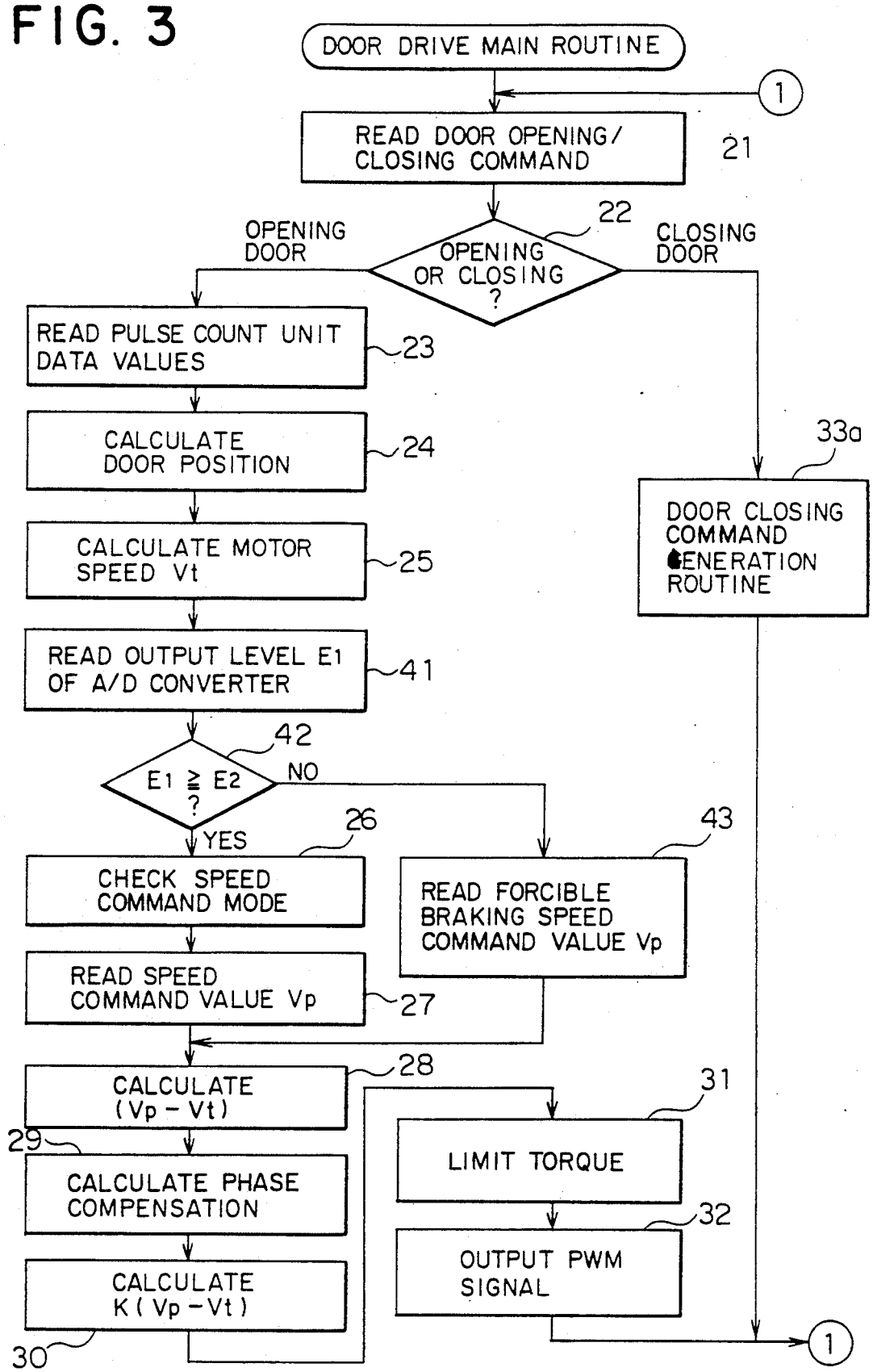
FIG. 3 is a flow chart of the door control operation of the embodiment shown in FIG. 1.
Figure 7:
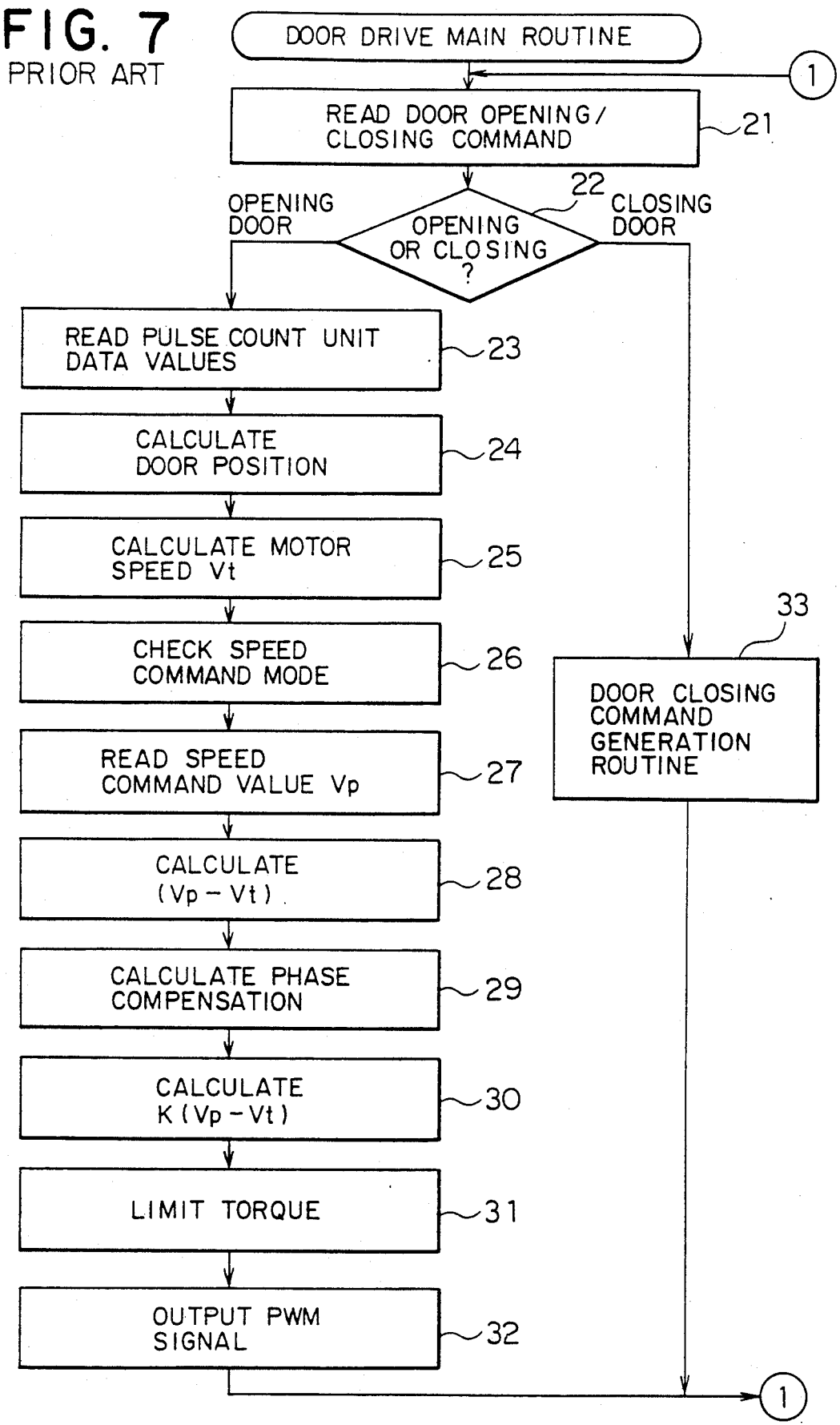
FIG. 7 is a flow chart of the operation of the controller shown in FIG. 5.

Next, the door control operation of this embodiment will be described below with reference to the flow chart of FIG. 3. The program in accordance with this flow chart is stored in the ROM 7B. In the flow chart shown in FIG. 3, steps having the same numbers as steps in the flow chart of FIG. 7 for the conventional door controller represent the same operations.

First, the operations of steps 21 to 25 are performed as in the conventional process. That is, door opening command signal 5a or door closing command signal 5b from the control panel 5 is read to determine whether the door is to be opened or closed. If the door is to be opened, the value of data in the pulse count unit 7D is read and the door position and the electric motor speed Vt are calculated. Thereafter, in step 41, the output level $E_1$ of the A/D converter 7F is read. At this time, the A/D converter 7F has converted the converter voltage detected by the converter voltage monitor circuit 11 and has stored the converted data in a register (not shown) provided in the A/D converter 7F. The value of this data is therefore read in step 41.

Figure 4:
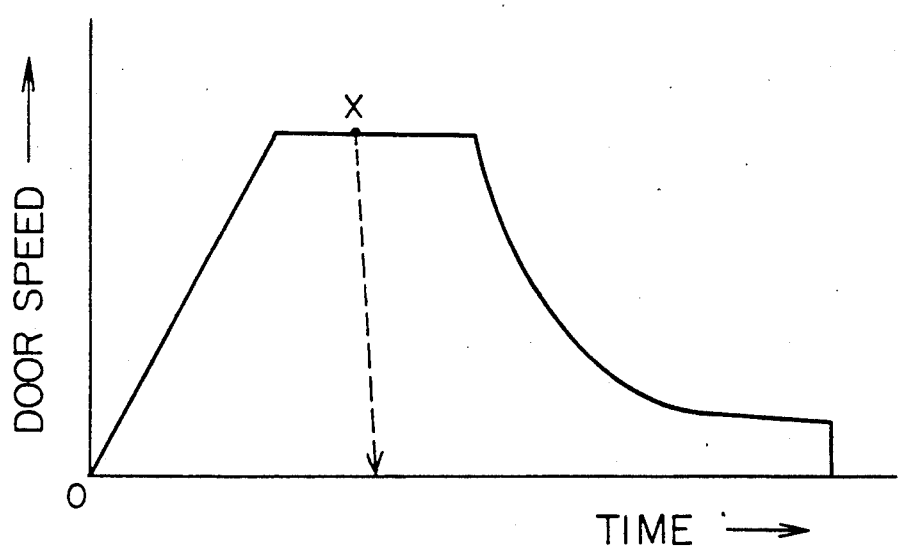
FIG. 4 is a diagram of a door speed characteristic of the embodiment shown in FIG. 1.

Next, determination is made in step 42 as to whether or not the output level $E_1$ of the A/D converter 7F is equal to or higher than a threshold level $E_2$. As shown in FIG. 2, the threshold level $E_2$ is set in correspondence with point C such as to be slightly lower than the minimum (point B) of the converter voltage, which is determined by the range of variation of the power source voltage during normal operation. If it is determined that the output level $E_1$ of the A/D converter 7F is equal to or higher than the threshold level $E_2$, the operations of steps 26 to 32 are performed as in the conventional process to output PWM signal from the PWM unit 7G to the gate signal generator circuit 10. The gates of the power transistors of the power circuit 2 are PWM-controlled, thereby controlling the speed of the electric motor 3. Consequently, the door opening operation is performed based on a speed characteristic indicated by the solid line in FIG. 4.

If it is determined in step 42 that the output level $E_1$ of the A/D converter 7F is lower than the threshold level $E_2$, the process proceeds to step 43, a forcible braking speed command value Vp is read out from a table previously stored in the ROM 7B, and the operations of steps 28 to 32 are performed by using the value Vp. That is, the speed of the electric motor 3 is controlled in accordance with the forcible braking speed command value Vp so that the door is quickly stopped. For example, if the power source voltage drops at point X of FIG. 4 so that $E_1 < E_2$, the door is stopped by being rapidly decelerated as indicated by the broken line, thereby preventing the risk of a runaway door.

If it is determined in step 22 that the door is to be closed, the process proceeds to step 33a and a door closing routine is conducted in the same manner as the door opening routine. In this case also, if the power source voltage drops so that $E_1 < E_2$ during door closing operation, the door is stopped by being rapidly decelerated at the corresponding time point and is prevented from moving by itself.

What is claimed is:

1. An apparatus for controlling an elevator door comprising:
   voltage monitor means for detecting a power source voltage for a resettable controller for an elevator door motor; and
   brake means for forcibly braking the motor controlled by the resettable controller if the power source voltage detected by said voltage monitor means is lower than an ordinary operating range of the power source voltage.

2. A door control apparatus according to claim 1 wherein said resettable controller has a reset voltage lower than said ordinary operating range of said power source voltage, and said brake means forcibly brakes the motor when the power source voltage detected by said voltage monitor means is between said reset voltage and a predetermined voltage lower than said ordinary operating range.

3. A door control apparatus according to claim 2 further comprising memory means for previously storing said predetermined voltage.

4. An apparatus for controlling an elevator door comprising:
   an electric motor for driving the door;
   power source means;
   control means for controlling electric power supplied from said power source means to said electric motor;
   control power source means for converting the voltage of said power source means into a voltage for operating said control means;
   reset means for resetting said control means when the output from said control power source means falls lower than a reset voltage;
   voltage monitor means for detecting the voltage of said power source means; and
   brake means for forcibly braking said motor if the voltage of said power source means detected by said voltage monitor means is lower than a an ordinary operating range of the power source voltage.

5. A door control apparatus according to claim 4 wherein said control means and said braking means comprise a microcomputer.

6. An apparatus for controlling a door of an elevator car comprising:
   an electric motor drivingly connected to a door of an elevator car to move the door between an open and a closed position;
   resettable control means for generating control commands for the motor;
   a power supply connected to the control means for supplying electric power to the control means;
   resetting means for resetting the control means when the voltage of the power supply falls below a reset voltage;
   voltage sensing means for sensing the voltage of the power supply; and
   braking means for braking the motor when the voltage sensed by the voltage sensing means falls below a braking voltage higher than the reset voltage.

7. An apparatus as claimed in claim 6 wherein the power supply has a minimum voltage during normal operation and the braking voltage is no higher than the minimum voltage.

8. An apparatus as claimed in claim 6 wherein the braking means comprises means for generating a braking speed command for the motor.

9. An apparatus as claimed in claim 6 wherein the power supply generated a DC voltage for the control means, and the voltage sensing means senses the DC voltage generated by the power supply.

* * * * *